United States Patent Office 2,741,966
Patented Apr. 17, 1956

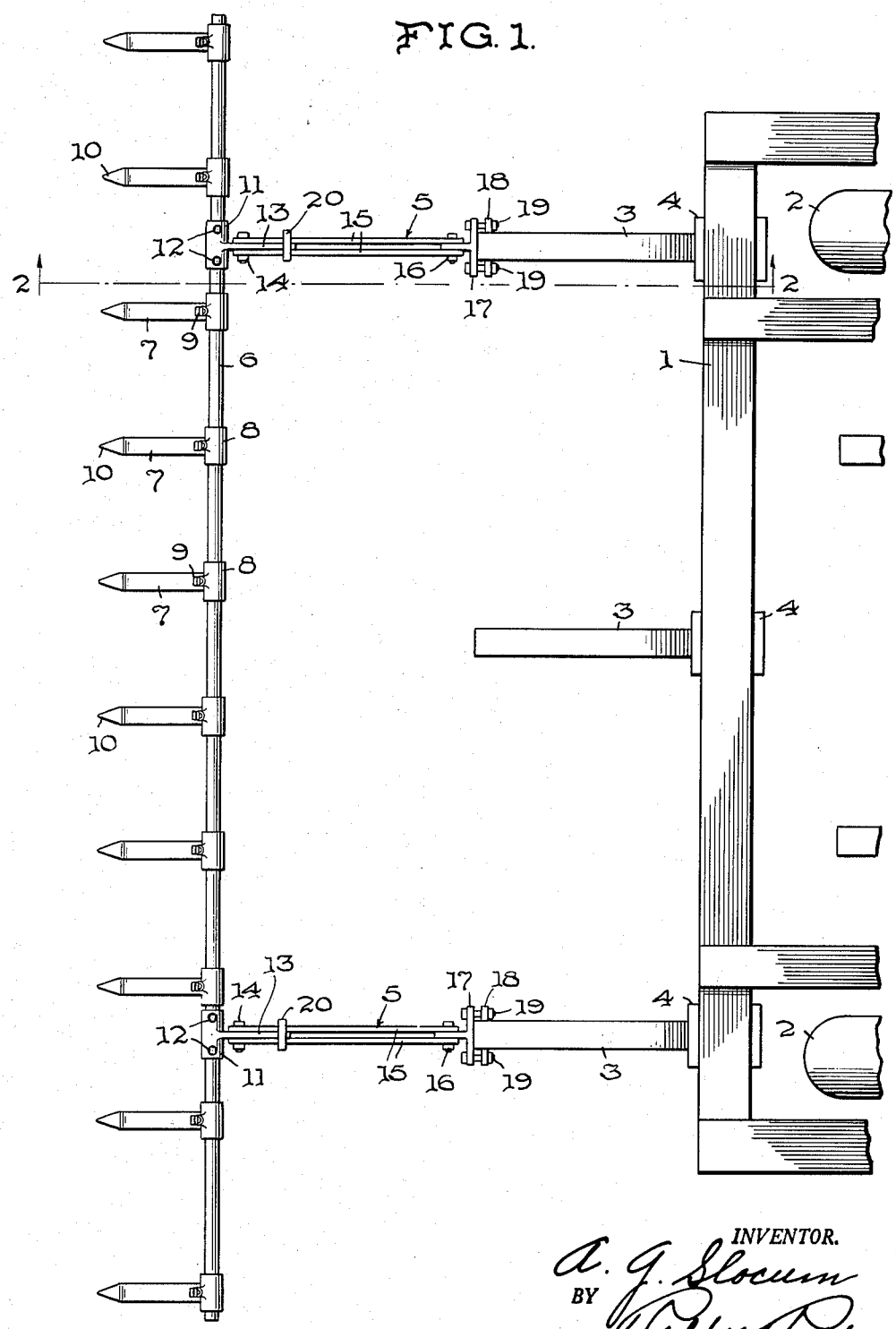

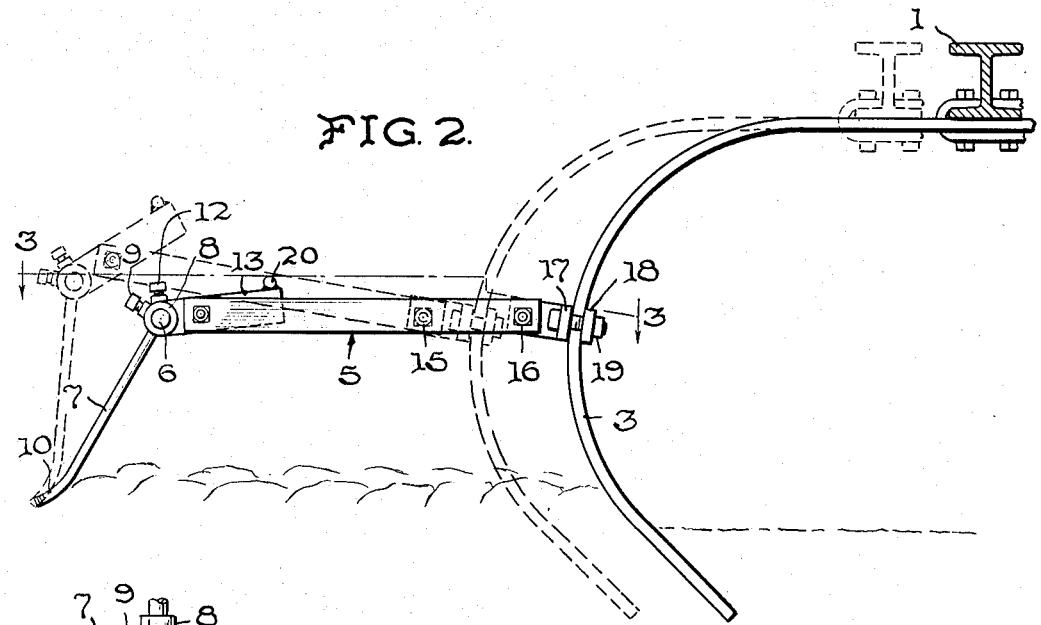
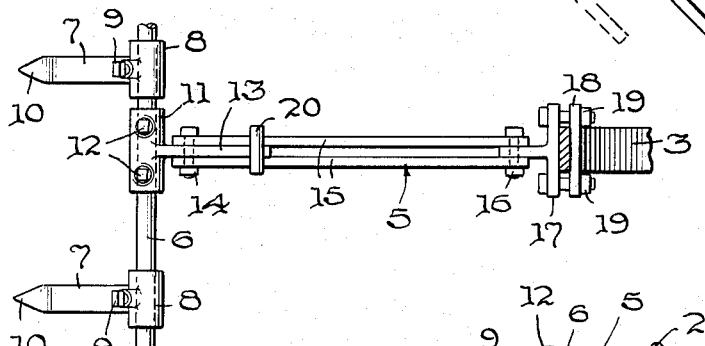
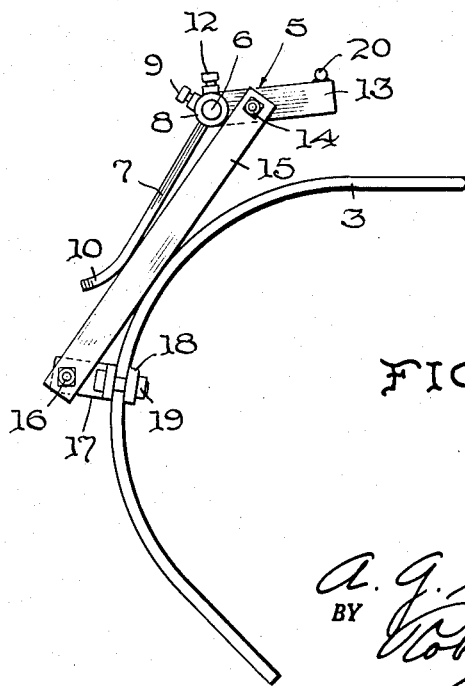

2,741,966

TOOTH BAR ATTACHMENT FOR HARROWS AND THE LIKE

Arthur G. Slocum, Ensign, Kans.

Application November 19, 1953, Serial No. 393,114

4 Claims. (Cl. 97—8)

The present invention relates to attachments for use with earth-working implements such as cultivators, harrows and the like, and more particularly to an attachment which is adapted to be connected to a cultivator or harrow to break up clumps or ridges and generally smooth the ground behind the cultivator or harrow as the cultivator or harrow is being drawn across a field with my improved attachment applied thereto.

In the use of conventional cultivators and harrows having a plurality of spaced teeth disposed in spaced relation transversely of the cultivator or harrow frame, ridges or mounds of soil are left between adjacent pairs of teeth as the implement moves across the field. Attachments have heretofore been provided for use in conjunction with cultivators or harrows for levelling off these ridges or mounds. Certain of these attachments have consisted of what is commonly referred to as a "tooth bar" having spring teeth or spikes adapted to flatten out the ridges formed between the cultivator or harrow teeth. Such tooth bar attachments usually include numerous parts and rather complicated attaching means for connecting the tooth bar to the cultivator or harrow frame, and they are a hindrance to easy manipulation of the cultivator or harrow, since, if it becomes necessary to back up the cultivator or harrow, the tooth bar has to be manually elevated or disconnected so as to avoid digging into the ground with resultant damage to the attachment.

An object of the present invention is to provide a tooth bar attachment for use with cultivators or harrows, said attachment being very effective and yet being extremely durable, as well as simple to manufacture, install and maintain.

Another object is to provide a tooth bar attachment as aforesaid which is adapted to be pivotally supported at the rear of a cultivator or harrow, and which may be easily shifted from an operative position in engagement with the ground to an inoperative position out of contact with the ground.

A further object is to provide a tooth bar attachment as aforesaid, which, when it is in its operative ground-engaging position, will be automatically shifted to a position permitting reverse movement of the cultivator or harrow upon commencement of such reverse movement.

Specifically, it is an object to provide a tooth bar attachment for use with cultivators or harrows, said attachment including a longitudinally extended bar having a plurality of laterally spaced outstanding teeth, said bar being pivotally mounted on a hitch bar or connection which is in turn adapted to be pivotally connected to a stationary part of the cultivator or harrow.

Other objects and advantages of the invention will be hereinafter described or will become apparent to those skilled in the art, and the novel features thereof will be defined in the appended claims.

In the drawings:

Fig. 1 is a view in top plan, showing the attachment connected to the rear of a conventional spring tooth harrow;

Fig. 2 is a view in vertical cross section, as taken on the line 2—2 of Fig. 1, showing in full lines the hitch assembly and tooth bar in the position they normally assume as the harrow is moving forwardly, or in starting to move rearwardly and the tooth bar is about to swing about its pivotal mounting, and showing in broken lines the positions assumed by the parts as the harrow continues to back up, with the teeth in the act of flipping over so as not to dig into the ground.

Fig. 3 is a view partly in top plan and partly in section, as taken on the line 3—3 of Fig. 2; and Fig. 4 is a view in side elevation, showing the attachment in an inoperative elevated position.

Like reference characters in the several figures of the drawings and in the following detailed description designate corresponding parts.

In Fig. 1, there is shown the rear end of a conventional harrow including a frame 1 which is supported on wheels 2, 2, the frame 1 having at its rearmost side a plurality of earth-working teeth 3 secured thereto in any suitable manner, as at 4. This harrow is merely illustrative of one type of farm implement to which the attachment of this invention may be applied, and is of the general type which is adapted to be drawn by a tractor across a field to be cultivated. During such cultivating operations, the teeth 3 of the harrow, in working up the ground, leave slight ridges of loose ground between the teeth.

My attachment, which is generally designated 5, includes a longitudinally extended rod or bar 6 having adjustably and removably mounted thereon a plurality of transversely spaced teeth 7. These teeth 7 are each preferably secured to a sleeve 8 which is adapted to be positioned on the bar or rod 6 and locked in a selected position on the bar 6 by means of a set screw 9 which is threadedly engaged in an opening in the sleeve 8 and is adapted to engage the rod or bar 6. The teeth 7 may be of any desired form, but in the illustrated embodiment, they are substantially flat and straight, but are provided at their free ends with a slightly curved point 10.

Hitch means are provided for connecting the rod or bar 6 to a stationary part of the harrow, and as illustrated in Fig. 1, at least two such hitches are used in spaced relation to one another, but in practice, any suitable number of these hitches may be utilized. Each hitch includes a sleeve 11 which is adapted to be slidably positioned on the rod or bar 6 and fixed in a selected position by means of one or more set screws 12 which extend through the sleeve 11 and engage the rod or bar 6. Projecting laterally from the sleeve 11 is a flat, longitudinally extended arm 13, this arm 13 being suitably secured to the sleeve 11, as by welding or the like, and having intermediate its ends an opening through which a bolt, pin or the like, as indicated at 14, may extend. The bolt 14 is adapted to pivotally secure on opposite sides of the arm 13 a pair of longitudinally extended links 15, these links 15 being secured at one end by the bolt 14 to the arms 13, and being pivotally connected, as by means of a bolt 16, to a substantially T-shaped bracket 17 is adapted to cooperate with a flat plate 18 to clamp a portion of one of the harrow teeth 3 between the bracket 17 and the plate 18. A pair of bolts 19 extend through the T-shaped bracket 17 and the plate 18 so as to apply a clamping pressure on the harrow tooth 3 between the bracket 17 and the plate 18. Thus, means is provided for connecting the hitch to a portion of the harrow.

It will be noted that the rod or bar 6, with the teeth 7 thereon, is pivotally mounted at one end of the links 15, while the other end of the links 15 is pivotally mounted on a stationary portion of the harrow, whereby the teeth 7 will be permitted to freely engage the ground.

In order to prevent the arm 13 from passing below the links 15, the free end of the arm 13 has secured thereto, as by welding or the like, a transversely disposed stop 20 which, when the attachment in an operative ground-engaging position, engages the top surface of the links 15 to limit pivotal movement of the arm 13 relative to the links 15 beyond that point at which the stop 20 abuts with the upper surfaces of the links 15. Thus, the links 15 are prevented from dropping down to the ground at the point of connection to the arm 13, and the weight of the attachment is caused to be borne by the teeth 7.

However, when it is desired to raise the attachment to an inoperative position out of engagement with the ground, the links 15 can be pivoted about the bolt 16 (see Fig. 4), until they rest against the harrow tooth 3, with the teeth 7 elevated substantially above the ground and the attachment will remain in this position to permit use of the harrow 3 alone, or when the harrow teeth have been elevated, to disengage the teeth 3 from the ground during transport.

Moreover, when it becomes necessary to back up the harrow so as to avoid obstacles or effect sharp turns, or otherwise, the points 10 of the teeth 7 will bite into the ground and cause the arm 13 to pivot about the bolt 14, as shown in broken lines in Fig. 2, so that the teeth 7 will not be damaged by reverse movement of the harrow, but will flop over and drag across the ground in an upside-down position. When forward motion of the harrow is resumed, the point 10 of the teeth 7 will again bite into the dirt and cause the arm 13 to swing about the bolt 14 so as to re-assume an operative position.

If a harrow of exceptionally great width is being used, a plurality of separate attachments embodying the present invention may be mounted at the rear of the harrow in end-to-end relation, or a single attachment having a rod or bar 6 of sufficient length may be utilized with a suitable number of hitching means 5 provided for the long bar. On the other hand, if a narrow harrow is being used, a relatively short bar may be used and a lesser number of hitching means 5 is needed to mount the rod or bar 6 on the harrow.

It will be understood that my attachment is adapted for use with cultivators or harrows on which the earth-working teeth are either widely or closely spaced apart, as by releasing the set screws 9, the teeth 7 may be shifted on the bar 6 so that the teeth 7 will be so located as to travel in a path intermediate adjacent pairs of the earth-working teeth 3 on the cultivator or harrow.

While one specific embodiment of the present invention has been herein shown and described, changes and alterations may be resorted to without departing from the spirit of the invention as defined in the appended claims.

I claim:

1. The combination with a harrow of the spring-tooth type, of an attachment connected to one of said harrow teeth, said attachment comprising a transversely extended tooth bar having auxiliary ground-working teeth thereon, an arm projecting radially from said bar, link means pivotally connected at one end to said arm, means pivotally connecting said link means at its other end to the harrow tooth for free pivotal movement independently of movement of said harrow tooth, from a generally upright position with said link means resting upon said harrow tooth and with said tooth bar in an elevated inoperative condition, to a position with said link means extending substantially horizontally and rearwardly of said harrow, and means for limiting pivotal movement in one direction of said arm relative to said link means when said link means is swung to a rearwardly extended position to dispose the auxiliary teeth on said bar in a ground-engaging operative position, while leaving the arm free for movement in the opposite direction to allow the auxiliary teeth to assume a non-working position when the harrow is moved rearwardly.

2. The combination as defined in claim 1, wherein the link means comprises a pair of longitudinally extended members disposed in side-by-side spaced relation, and the means pivotally connecting said link means to the harrow tooth includes a hitch member having a portion disposed between said members and pivotally connected thereto, and clamping means removably secured to said hitch member for securing the latter to said harrow tooth.

3. The combination as defined in claim 1, wherein said link means comprises a pair of longitudinally extended members disposed on opposite sides of the arm projecting from the bar, and the means for limiting pivotal movement of the link means relative to the arm comprises a stop member carried by the free end of said arm and projecting laterally therefrom for engagement with said link means.

4. The combination as defined in claim 1, wherein said link means comprises a pair of longitudinally extended members disposed on opposite sides of the arm projecting from the bar, and the means for limiting pivotal movement of the link means relative to the arm comprises a stop carried by one of said latter members and engageable with the other of said members.

References Cited in the file of this patent
UNITED STATES PATENTS

| | | |
|---|---|---|
| 857,711 | Arnold | June 25, 1907 |
| 2,136,851 | Jess | Nov. 15, 1938 |
| 2,256,563 | Kamplade | Sept. 3, 1941 |
| 2,522,011 | Young | Sept. 12, 1950 |
| 2,613,581 | Pretzer | Oct. 14, 1952 |